Figure 3:
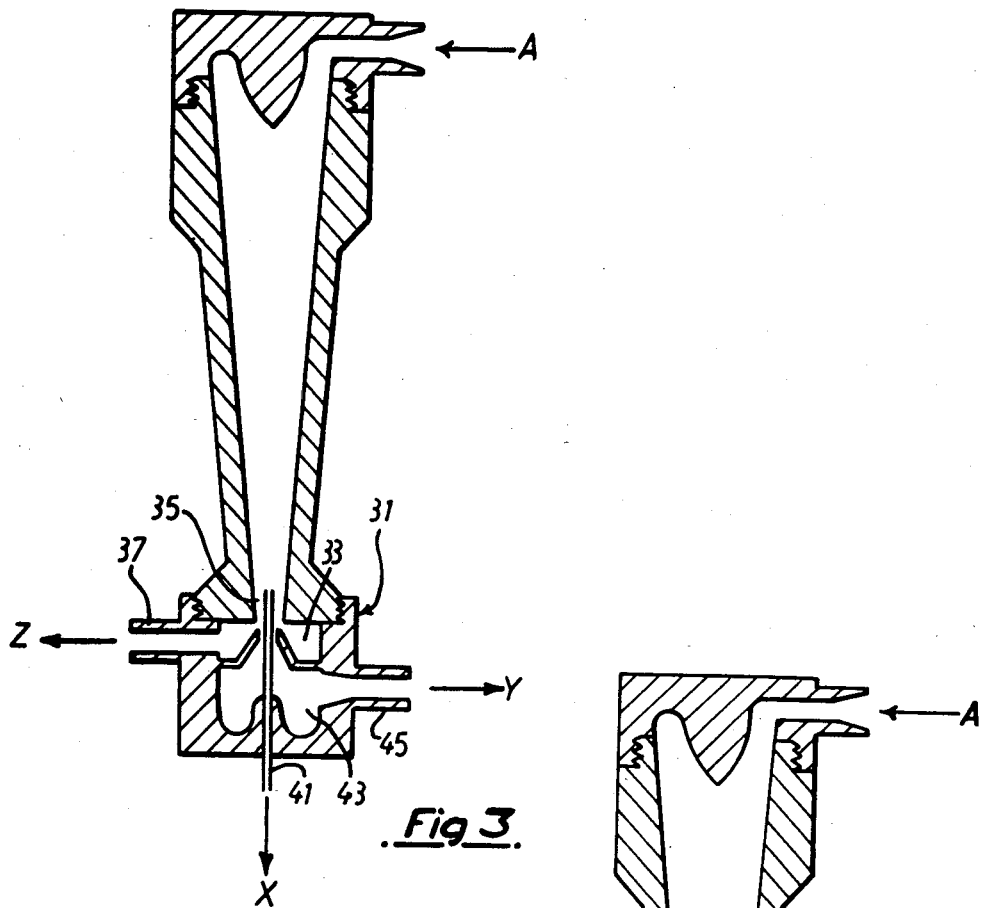

United States Patent [19]
Peel et al.

[11] Patent Number: 4,578,199
[45] Date of Patent: Mar. 25, 1986

[54] CYCLONE SEPARATORS

[75] Inventors: John D. Peel, Cheshire; Paul A. Knight, Lancashire, both of England

[73] Assignee: Beloit Corporation, Beloit, Wis.

[21] Appl. No.: 726,303

[22] Filed: Apr. 25, 1985

Related U.S. Application Data

[63] Continuation of Ser. No. 520,021, Aug. 3, 1983, abandoned, which is a continuation-in-part of Ser. No. 346,176, Feb. 5, 1982, abandoned.

[30] Foreign Application Priority Data

Feb. 14, 1981 [GB] United Kingdom ............... 8104678

[51] Int. Cl.$^4$ .............................................. B04C 5/04
[52] U.S. Cl. .................................... 210/788; 209/211; 210/512.1
[58] Field of Search .................. 210/788, 512.1, 512.3; 209/144, 211; 55/457, 458, 459 R, 412

[56] References Cited

U.S. PATENT DOCUMENTS

| | | | |
|---|---|---|---|
| 379,009 | 3/1888 | DeRycke | 55/457 |
| 2,706,045 | 4/1955 | Large | 210/512.2 |
| 2,726,767 | 12/1955 | Rakowsky | 210/512.1 |
| 2,816,490 | 12/1957 | Boadway et al. | 210/512.1 |
| 2,852,091 | 9/1958 | Boudreaux et al. | 210/512.1 |
| 3,925,045 | 12/1975 | Cheng | 55/459 D |
| 4,378,289 | 3/1983 | Hunter | 210/512.1 |

*Primary Examiner*—John Adee
*Attorney, Agent, or Firm*—Dirk J. Veneman; Raymond W. Campbell; Gerald A. Mathews

[57] ABSTRACT

The invention concerns a method and apparatus for separating fluids containing particulate matter into two or more fractions of different densities. A cyclone separator (1) is utilized for this purpose and differs from previous constructions inasmuch as it is a uni-directional, air-cored device having an inlet (7) only for the fluid (A) in the top and two separate outlets (11, 15) in the bottom, remote from the inlet, one (11) of which outlets extend axially of the separator. In operation particles (as defined in the specification) once separated from the streamline (A') in which they enter the device are constrained against traversing that streamline. Means (5) are provided adjacent the inlet (7) to stabilize the initial flow of fluid. The axially extending outlet (11) may be adjustable.

6 Claims, 4 Drawing Figures

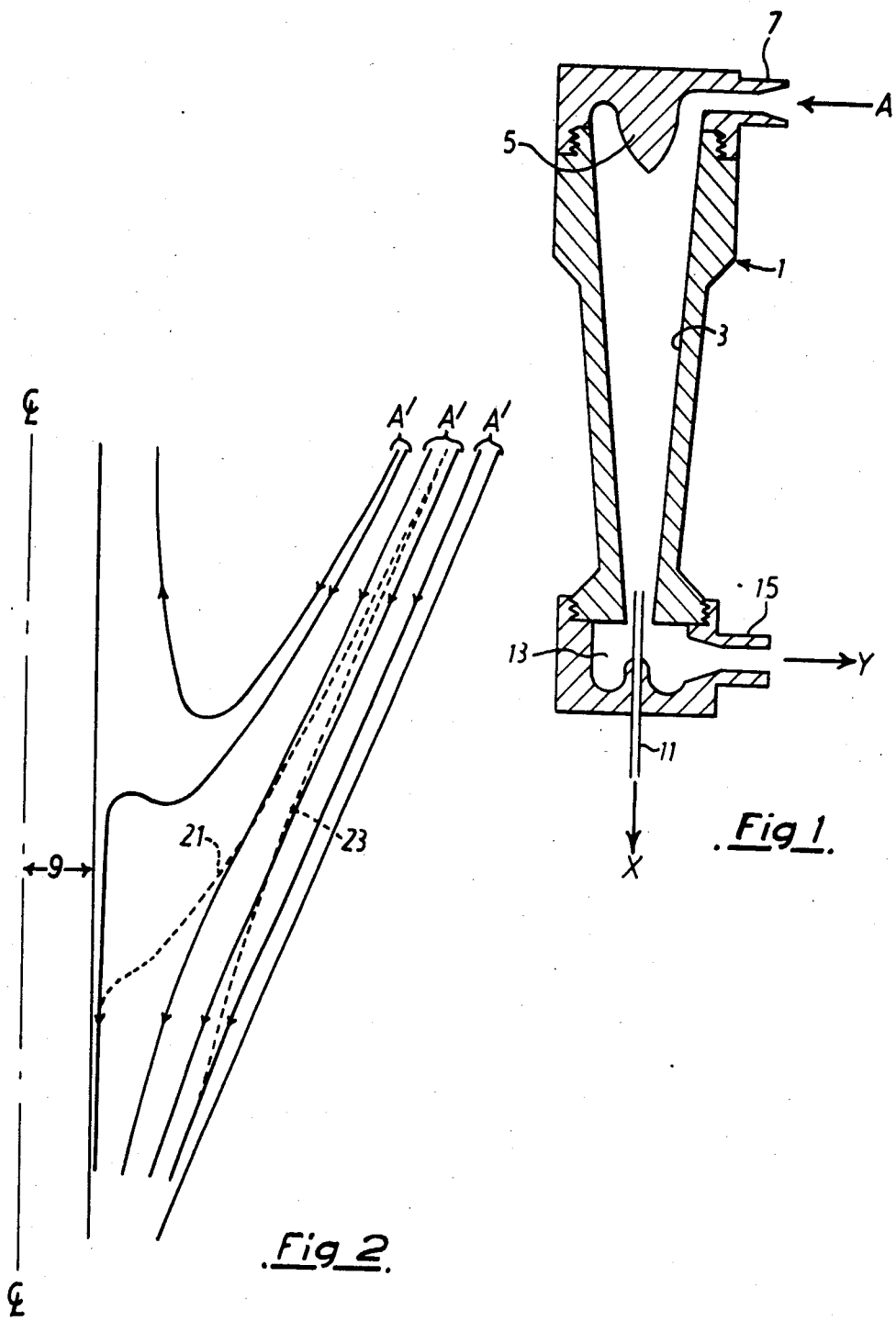

CYCLONE SEPARATORS

This is a continuation of co-pending application Ser. No. 520,021, filed Aug. 3, 1983, now abandoned, which is a Continuation-in-Part of application Ser. No. 346,176 filed Feb. 5, 1982, now abandoned.

DESCRIPTION

The present invention concerns improvements in and relating to cyclone separation and more particularly relates to a method of cyclone separation of particulate matter contained in a fluid, from the fluid. It also concerns a cyclone separator for effecting the method.

For the purpose of the present specification, the word "particles" is intended to cover not only solid particles, but also droplets of a liquid, gas bubbles and combinations of solid, liquid and gas particles. In this way, it is possible to separate entrained impurities from a fluid, such impurities as ink and rubber or other adhesions sometimes known as "stickies", as well as air and small fiber bundles known as shives.

An object of the present invention is to provide a method and conical hydrocyclone separator for efficaciously effecting separation of particulate matter from a fluid.

The particles may be referred to as being "dense" of "light". "Dense" particles are those which have a density greater than that of the fluid in which they are suspended, while "light" particles are those which have a density less than that of the fluid. Their size range will normally be limited by devices located upstream or ahead of the cyclone in the cleaning system and by the dimensions of the cyclone. The fluids for which the present invention has been developed are liquids used in papermaking, namely pulp stocks containing solid particles suspended in water. In describing the invention hereafter, reference will be made to such pulp stocks. Unless the water density has been altered by solids dissolved therein, the light particles in such stocks will normally have a density less than 1 g/cm$^3$ and the dense particles a density greater than 1 g/cm$^3$.

It is generally not too difficult to separate particles having densities much greater than 1 g/cm$^3$ or much less than 1 g/cm$^3$. However, when the specific gravity is close to 1 g/cm$^3$, the particles are slower in separating. They will require higher pressures and multiple stage operation. This is very expensive from an equipment and energy point of view.

In most conventional forms of cyclone separators at least one of the outlets for a separated fraction is located in close proximity to the inlet—often towards the top of the device. Such arrangements invariably operate with a reverse vortex action, the liquid being treated initially passing down through the device in a helical path and a fraction thereafter flowing upwardly i.e. in a reverse direction within the original helix. Moreover, in most conventional cyclone separators, those fractions (if any) which are extracted at the bottom, or the opposite end to the feed, are usually taken out radially, circumferentially or tangentially. Both these factors involve separated particles traversing or re-crossing the streamline within which they enter the device. It is an object of this invention to avoid or mitigate these disadvantages.

According to the present invention, a method of separating a fluid containing particulate matter into a plurality of fractions in which the fluid is fed into the top of an air-cored cyclone separator and is extracted in two or more fractions from remote outlets in the bottom of the separator, is characterized in that the fluid is constrained to adapt a uni-lateral flow within the separator, each fraction is extracted at the botoom of the separator from a region adjacent that bottom, and at least one of the fractions is extracted axially.

In an embodiment of the present invention, a conical cyclone with an air core is created with the liquid containing the entrained particles and all the input to the cyclone is withdrawn at the apex or bottom thereof as at least two separate output flows. The particle content of the outflows depends on the mode of operation of the cyclone and on the particle content of the input flow. Thus, if two separate output flows are taken and one is, say, a 10% fraction of the input flow taken off from the region of the air core adjacent the apex of the cyclone, the 10% fraction will be relatively rich in light particles while the remainder will be relatively poor therein.

The separation is caused by the effect that the entrained particles in a cyclone of the liquid in which they are entrained will follow pathways which tend to concentrate the particles in a particular region of the liquid cyclone, and obviate traversing or re-crossing their original streamlines.

It has been found that in the cyclone with entrained particles of the specified specific gravities, the particles move in the direction of the specified outlet in such a manner that they leave the fluid streamlines in which they are first located after entry to the separator, but neither light nor heavy particles re-cross those streamlines to reach their respective outlets.

In addition, it has been found that lightweight rejects of a higher specific gravity such as those above 0.8 g/cm$^3$ are effectively removed. Of particular interest are stickies and shives whose specific gravity is very close to 1 g/cm$^3$ and may even be greater than 1 g/cm$^3$. Even these very difficult to remove rejects quite surprisingly move efficiently too and are extracted through the axial outlet port of the present invention. For purposes of this invention, therefore, light rejects shall mean rejects of a specific gravity of 0.8 to 1 g/cm$^3$ and rejects of a specific gravity of more than 1 g/cm$^3$ which because of their physical characteristics move to the light rejects' outlet such as stickies and shives. Light rejects, therefore, will include ink, rubber, adhesives and shives.

In practice, the liquid entraining the particles is introduced generally tangentially into the device, through a pipe and entrance port whose cross-sectional shape and entry angle is selected to optimize flow conditions in the separator.

The present invention will now be described, by way of example only, with reference to the accompanying drawings, in which:

FIG. 1 is a sketch in elevational section of a hydrocyclone separator in accordance with the present invention; and FIG. 2 is a diagram showing streamline pattern and particle paths on one side of the center line of the separator of FIG. 1.

The invention is applicable to a small angle conical, substantially conical or cylindrical cyclone separator.

Referring to FIG. 1, the separator, shown generally indicated at 1, is a small-angle conical cyclone separator, designed to separate a liquid input into two fractions, namely a light reject flow X and an accept flow Y, both of which are taken off at the bottom end of the device. The separator does not have to be strictly conical, e.g. it may be in the form of a surface of revolution of a slightly curved line, which may be curved convexly or concavely with respect to the axis of rotation. The separator provides a conical-shaped vessel 3 at the top of which is an inlet arrangement 7 for tengentially injecting, under pressure, a liquid feed A with the particles to be separated therefrom entrained therein. The inlet feed liquid flows around a centrally located core stabilizer 5, of approximately conical chape, whose apex may extend considerably into the separator, thereby also controlling the extent of roll vortexing as described below. It will be noted that the inlet 7 is remote (i.e. at the opposite end of the separator) from all the outlets as hereafter described. The liquid fed in through inlet 7 swirls around within the separator at sufficient velocity to form a uni-directional flow cyclone with a central air core 9 (see FIG. 2). One fraction of the liquid, constituting a light reject flow X, is removed axially from the separator through a bottom outlet pipe 11, which may be adjustable in axial position, closely adjacent the air core and near the cyclone apex, while the remainder, constituting an "accept" flow Y, passes into an output chamber 13 from where the liquid as an acceptable fraction Y passes from the separator via an outlet 15. The outlet pipe 11 is thus adapted and arranged to extend through the output chamber 13 and into the discharge end of the conical chamber 3 such that light rejects efficiently move to and exit through the pipe 11 while the remainder of the material is discharged into the chamber 13. It is an important aspect of this invention that the inlet is at the top of the separator, remote from all outlets and that one of the separator fractions is extracted axially at the bottom and from a region close to the apex, If the liquid in this instance contains both light and heavy particles, then the heavy particles form part of the accept fraction Y and only the light particles are contained in the light reject fraction X. Referring to FIG. 2, it will be seen that the light and heavy particles in each constituent streamline A' follow different paths 21, 23 respectively, indicated in broken lines. It is important to note that the particles leave the inlet streamline A' in which they are first located, and do not subsequently re-cross that streamline as they separate into their individual fractions. The light particles generally move inwardly along path 21 towards the air core 9 while the heavy particles move along path 23 towards the wall of the separator, the streamlines in between thus becoming depleted or starved of particles.

The flow in the outer region of the cyclone is similar to that achieved in a conventional conical cyclone separator in which the so-called accepts portion (i.e. acceptable, relatively heavy particles) and sometimes a rejects portion (i.e. non-acceptable, relatively light particles) are taken out by a vortex finder in their upper regions of the conical vessel in the vicinity of the outlet. Similarly the flow is dominated by a substantial roll vortex and possibly a weaker secondary vortex, but, in this instance, there is a sink flow due to the bottom extraction of both the reject X and accept Y, and the fact that one of these fractions is extracted axially. Thus, the conventionally achieved roll vortex is dragged down into the cyclone, which acts as a uni-directional flow arrangement with no net upward or reverse flow.

The roll vortex in coventional cyclone separators takes the approximate form of a torus which has its axis of revolution concentric with the separator's longitudinal axis. The flow of fluid within the torus configuration, as viewed in a substantially ring-like, vertical cross section thereof, is upwardly along the center "hole" of the torus and downwardly along its outer periphery.

When a secondary roll vortex is present, it is similarly arrayed with the first roll vortex about the separator's longitudinal axis, but below the first roll vortex, nearer the bottom of the separator.

Knowing the amount of reject flow X through the outlet pipe 11, the extent of separation of the various sizes of particles can be calculated, it being understood that dense particles are considered to be captured if they reach the boundary side wall of the separator. It has been found that the illustrated cyclone deals equally well with both light particles and dense particles, assuming that the latter are required to be located in the accept flow Y. This is in contrast to the conventional cyclone separator which is much less effective with the light particles than it is with dense particles.

In the operation of conventional separators having an inner vortex finder for taking off the light rejects portion and an outer vortex finder for taking off the accepts portion with both finders located at the wide end of the conical vessel of the separator, it has been observed that light particles leaving a streamline re-cross the streamline of their trajectories to their outlet.

Also, some of the fluid going into conventional cyclones flows directly into the vortex finders and hence out of the apparatus without being subjected to the cyclone action. This effect is known as "short circuiting" or leakage. Both these effects reduce the efficiency of the cyclone, and are avoided by the present invention. The first effect is avoided by virtue of the fact that there is no net flow upwardly (in a reverse direction) through the cyclone, and the second by virtue of the fact that the accept discharge is physically located at the opposite end of the cyclone to the input.

It has also been found that the illustrated cyclones give rise to substantially better separation than that achieved in conventional ones when measured at similar levels of energy consumption. The reject liquid flow is also substantially lower so that, in the cleaning of paper pulp suspensions, the reject rate of fiber is lower.

Thus, it can be seen that the present invention provides a method and means of removing light rejects as defined herein which have heretofore presented substantial problems to paper makers.

We claim:

1. A method of separating a relatively light, rejects portion of particulate matter from a relatively heavy, accepts portion of particulate matter carried by an aqueous fluid mixture of both portions thereof, comprising the steps:
   (1) feeding a stream of the fluid mixture into the upper region of a substantially vertically-disposed cyclone separator tangentially thereof at an angle to the longitudinal axis of the separator;
   (2) constraining all of the fluid mixture to move in a substantially unilateral, streamline flow spirally toward the lower region of the cyclone separator;
   (3) establishing an air core along the longitudinal axis of the separator;
   (4) maintaining the lower end of the separator open;
   (5) intercepting and separating the rejects portion in a region near the longitudinal axis of the separator within, and above, the lower end thereof;
   (6) guiding the remaining accepts portion between the intercepted rejects portion and the interior wall of the cyclone separator to the periphery of the lower end thereof;

(7) discharging both accepts and rejects portions of the fluid mixture through the lower end of the cyclone separator.

2. The method as set forth in claim 1, further including the step of:

stabilizing the incoming stream of fluid mixture in the upper region of the cyclone separator.

3. The method as set forth in claim 1, wherein:

the separation of the accepts and rejects portions of the fluid mixture is physically accomplished at a selected one of positions along the longitudinal axis of the cyclone separator.

4. The method as set forth in claim 1, wherein:

the air core is established from substantially the top to the bottom of the separator.

5. A hydrocyclone separator for separating a relatively light, rejects portion of particulate matter from a relatively heavy, accepts portion of particulate matter carried by an aqueous fluid mixture of both portions thereof, comprising:

a chamber having a longitudinal axis and a continuous curved wall thereabout and coextending therewith, an inlet opening at one end and an outlet opening at its other end, said inlet opening being substantially tangential to the curved wall and at an angle to the longitudinal axis, said outlet opening being concentric with the longitudinal axis;

means for constraining all of the incoming fluid mixture to travel along a substantially unilateral, streamline flow spirally through the chamber toward the outlet opening;

an outlet chamber disposed about the outlet opening to receive the aqueous mixture of the accepts portion of the particulate matter which is traveling near the separator wall;

a pipe extending through the outlet chamber and into the outlet opening, concentric therewith, and into the chamber to receive the aqueous mixture of the rejects portion of the particulate matter which is traveling near the longitudinal axis of the separator.

6. A hydrocyclone separator as set forth in claim 5, further including:

a stabilizer centrally disposed near the inlet opening and extending toward the outlet opening for guiding the incoming aqueous mixture stream during the initial phase of its flow through the separator.

* * * * *

UNITED STATES PATENT AND TRADEMARK OFFICE
CERTIFICATE OF CORRECTION

Figure 4:
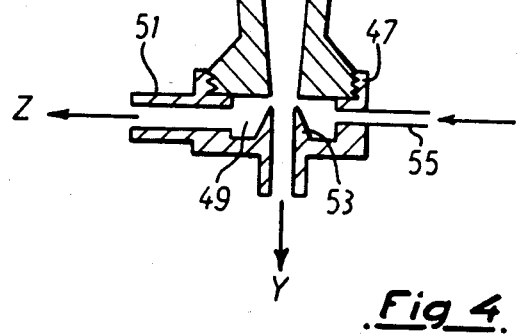

PATENT NO. : 4,578,199
DATED : March 25, 1986
INVENTOR(S) : John D. Peel & Paul A. Knight It is certified that error appears in the above–identified patent and that said Letters Patent are hereby corrected as shown below:

Cancel Figures 3 and 4.

Signed and Sealed this

Twenty-ninth Day of July 1986

[SEAL]

Attest:

DONALD J. QUIGG

*Attesting Officer*     *Commissioner of Patents and Trademarks*

REEXAMINATION CERTIFICATE (854th)
United States Patent [19]
Peel et al.

[11] B1 4,578,199
[45] Certificate Issued    May 3, 1988

[54] CYCLONE SEPARATORS

[75] Inventors: John D. Peel, Cheshire; Paul A. Knight, Lancashire, both of England

[73] Assignee: Beloit Corporation, Beloit, Wis.

Reexamination Request:
No. 90/001,261, Jun. 15, 1987

Reexamination Certificate for:
Patent No.: 4,578,199
Issued: Mar. 25, 1986
Appl. No.: 726,303
Filed: Apr. 25, 1985

Certificate of Correction issued Jul. 29, 1986.

Related U.S. Application Data

[63] Continuation of Ser. No. 520,021, Aug. 3, 1983, abandoned, which is a continuation-in-part of Ser. No. 346,176, Feb. 5, 1982, abandoned.

[30]    Foreign Application Priority Data

Feb. 14, 1981 [GB]  United Kingdom ............... 8104678

[51] Int. Cl.⁴ ..................... B04C 5/04; B04C 5/107
[52] U.S. Cl. ........................... 210/512.1; 210/788; 209/211
[58] Field of Search ............ 210/788, 512.1, 512.3; 209/144, 211; 55/457, 458, 459 R, 412

[56]    References Cited
U.S. PATENT DOCUMENTS

| | | |
|---|---|---|
| 2,346,005 | 4/1944 | Bryson . |
| 2,538,870 | 1/1951 | Hunter ............... 210/512.1 |
| 2,645,346 | 7/1953 | Staege et al. . |
| 2,757,581 | 8/1956 | Freeman et al. . |
| 2,816,490 | 12/1957 | Boadway et al. . |
| 2,849,930 | 9/1958 | Freeman et al. . |
| 2,920,761 | 1/1960 | Freeman et al. . |
| 3,754,655 | 8/1973 | Troland ............... 210/512.1 |
| 3,771,290 | 11/1973 | Stethem ............... 210/512.1 |
| 3,807,142 | 4/1974 | Rich et al. . |
| 4,378,289 | 3/1983 | Hunter . |
| 4,414,112 | 11/1983 | Simpson et al. . |

FOREIGN PATENT DOCUMENTS

| | | |
|---|---|---|
| 789373 | 7/1968 | Canada . |
| 953601 | of 1955 | Fed. Rep. of Germany . |
| 1314386 | of 1962 | France . |
| 111887 | of 1944 | Sweden . |
| 537771 | of 1941 | United Kingdom . |
| 740588 | of 1955 | United Kingdom . |
| 390838 | of 1973 | U.S.S.R. . |

OTHER PUBLICATIONS

Clay, "Pulp Production: Bergstrom firds 'reverse cleaning' answer to lightweight contaminants", *Paper Trade Journal*, Aug. 15, 1980, pp. 28–30.

*Primary Examiner*—Richard V. Fisher

[57]    ABSTRACT

The invention concerns a method and apparatus for separating fluids containing particulate matter into two or more fractions of different densities. A cyclone separator (1) is utilized for this purpose and differs from previous constructions inasmuch as it is a uni-directional, air-cored device having an inlet (7) only for the fluid (A) in the top and two separate outlets (11, 15) in the bottom, remote from the inlet, one (11) of which outlets extend axially of the separator. In operation particles (as defined in the specification) once separated from the streamline (A') in which they enter the device are constrained against traversing that streamline. Means (5) are provided adjacent the inlet (7) to stabilize the initial flow of fluid. The axially extending outlet (11) may be adjustable.

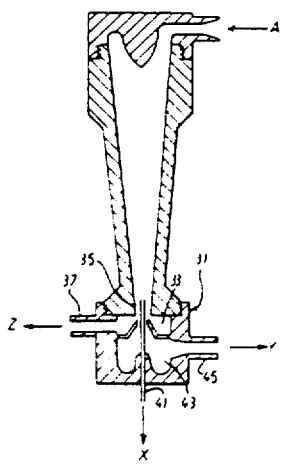

REEXAMINATION CERTIFICATE ISSUED UNDER 35 U.S.C. 307

THE PATENT IS HEREBY AMENDED AS INDICATED BELOW.

Matter enclosed in heavy brackets [] appeared in the patent, but has been deleted and is no longer a part of the patent; matter printed in italics indicates additions made to the patent

AS A RESULT OF REEXAMINATION, IT HAS BEEN DETERMINED THAT:

Claims 1–4 and 6 are cancelled.

Claim 5 is determined to be patentable as amended.

5. [A] *An air-cored* hydrocyclone separator for separating a relatively light, rejects portion of particulate matter from a relatively heavy, accepts portion of particulate matter carried by an aqueous fluid mixture of both portions thereof, comprising:
  a *vertically-disposed* chamber having *upper and lower ends and* a longitudinal axis and a *smooth,* continuous curved wall thereabout and coextending therewith *from the upper end to the lower end, means defining* an inlet opening [at one] *only at its upper* end and an outlet opening *means only* at its [other] *lower* end, said inlet opening being substantially tangential to the curved wall and at an angle to the longitudinal axis, said outlet opening *means* being concentric with the longitudinal axis *and including an outlet opening concentric with the longitudinal axis;*
  means, *including a stabilizer centrally-disposed near the inlet opening having a wall tapering inwardly toward an end thereof away from the inlet opening and extending forward toward the outlet opening means for guiding the incoming aqueous mixture stream and controlling the extent of roll vortexing,* for constraining all of the incoming fluid mixture to travel along a substantially unilateral, streamline flow spirally through the chamber toward the outlet opening *means, whereby a central air core is established along the longitudinal axis of the separator;* and
  an outlet chamber *being larger than, and disposed about,* the outlet opening to receive the aqueous mixture of the accepts portion of the particulate matter which is traveling near the separator wall;
  *said outlet opening means including* a pipe extending through the outlet chamber and into the outlet opening, concentric therewith, and into the chamber to receive the aqueous mixture of the rejects portion of the particulate matter which is traveling near the longitudinal axis of the separator, *whereby all of the inlet fluid mixture, including all of the accepts and rejects portions, is discharged at the lower end of the separator.*

* * * * *